United States Patent [19]
Mealey et al.

[11] Patent Number: 5,758,997
[45] Date of Patent: Jun. 2, 1998

[54] SELF-CENTERING INDEXABLE DRILL

[76] Inventors: Michael Mealey, 108 Hazelton La., Oak Ridge, Tenn. 37830; Benjamin D. Greenwell, 1535A Colemen Rd., Knoxville, Tenn. 37909

[21] Appl. No.: 689,220

[22] Filed: Aug. 7, 1996

[51] Int. Cl.⁶ .................................................. B23B 51/02
[52] U.S. Cl. ................................... 408/224; 408/230
[58] Field of Search ....................... 408/223, 224, 408/230

[56] References Cited

U.S. PATENT DOCUMENTS

| | | | |
|---|---|---|---|
| 3,751,177 | 8/1973 | Faber | 408/224 |
| 4,124,328 | 11/1978 | Hopkins | 408/223 |
| 4,303,358 | 12/1981 | Grusa | 408/223 |
| 4,367,991 | 1/1983 | Grafe et al. | 408/224 |
| 4,563,113 | 1/1986 | Ebenhoch | 408/223 |
| 4,648,760 | 3/1987 | Karlsson et al. | 408/223 |
| 4,659,264 | 4/1987 | Friedline | 408/204 |
| 4,859,123 | 8/1989 | Koesashi et al. | 408/233 |
| 4,889,455 | 12/1989 | Karlsson et al. | 408/188 |
| 4,984,943 | 1/1991 | Hamilton | 408/144 |
| 5,049,011 | 9/1991 | Bohnet et al. | 408/223 |
| 5,259,707 | 11/1993 | Keller | 408/233 |
| 5,269,618 | 12/1993 | Meyer | 408/188 |
| 5,302,059 | 4/1994 | Fabiano | 408/223 |
| 5,314,272 | 5/1994 | Kubota | 408/224 |
| 5,340,246 | 8/1994 | Tukala | 408/233 |
| 5,474,407 | 12/1995 | Rödel et al. | 408/227 |
| 5,478,179 | 12/1995 | Kress et al. | 408/199 |
| 5,509,761 | 4/1996 | Grosman et al. | 408/223 |

FOREIGN PATENT DOCUMENTS

| | | | |
|---|---|---|---|
| 104604 | 6/1985 | Japan | 408/224 |
| 1579648 | 7/1990 | U.S.S.R. | 408/224 |

*Primary Examiner*—Daniel W. Howell
*Attorney, Agent, or Firm*—Pitts & Brittian, P.C.

[57] ABSTRACT

A self-centering indexable drill having cutting inserts disposed such that cutting forces on the inboard and outboard flutes of the drill body are substantially equal while boring a hole, thereby keeping the drill body substantially centered. The drill includes a drill body and a plurality of cutting inserts. The drill body includes a shank portion configured to be received by the spindle of a machine using the drill, a collar, and a fluted portion. The fluted portion of the drill body defines an inboard flute and an outboard flute. At least one cutting insert is releasably secured to each of the inboard and outboard flutes, with an equal number of cutting inserts carried by each. An insert pocket is defined by the drill for closely receiving each cutting insert such that the leading face of the cutting insert is substantially flush with the face of the flute. The cutting inserts are spaced on the inboard and outboard flutes such that as the drill bores a workpiece, the material removed by the cutting inserts on the inboard flute is equal to that removed by the cutting inserts on the outboard flute. The exposed cutting edge of the innermost inboard cutting insert is disposed at a first angle with respect to a line normal to the axis of rotation. Each remaining cutting insert carried by the inboard flute, and each cutting insert carried by the outboard flute is disposed at a second angle with respect to a line normal to the axis of rotation. A drill guide may be provided for assisting in preventing the drill from drifting off-center, especially when the exit surface of the workpiece is not parallel to the entrance surface of the workpiece.

12 Claims, 5 Drawing Sheets

SELF-CENTERING INDEXABLE DRILL

TECHNICAL FIELD

This invention relates to the field of boring tools. Specifically, the present invention relates to a drill body having cutting inserts disposed such that cutting forces on the inboard and outboard flutes of the drill body are substantially equal while boring a hole, thereby keeping the drill body substantially centered.

BACKGROUND ART

In the field of boring tools, it is well known to use drill bodies having replaceable cutting inserts. The cutting inserts typically are multifaceted, with each facet defining a cutting edge, thereby allowing the same insert to be used several times before being replaced. Typical drill bodies and inserts are those disclosed in the following U.S. Patents:

| U.S. Pat. No. | Inventor(s) | Issue Date |
| --- | --- | --- |
| 4,124,328 | D. A. Hopkins | Nov. 7, 1978 |
| 4,563,113 | S. Ebenhoch | Jan. 7, 1986 |
| 4,659,264 | E. J. Friedline | Apr. 21, 1987 |
| 4,859,123 | Y. Koesashi, et al. | Aug. 22, 1989 |
| 4,889,455 | K. O. Karlsson, et al. | Dec. 26, 1989 |
| 4,984,943 | M. N. Hamilton | Jan. 15, 1991 |
| 5,049,011 | S. Bohnet, et al. | Sep. 17, 1991 |
| 5,259,707 | D. L. Keller | Nov. 9, 1993 |
| 5,269,618 | M. D. Meyer | Dec. 14, 1993 |
| 5,302,059 | J. F. Fabiano | Apr. 12, 1994 |
| 5,314,272 | M. Kubota | May 24, 1994 |
| 5,340,246 | T. Tukala | Aug. 23, 1994 |
| 5,474,407 | H. Rödel, et al. | Dec. 12, 1995 |
| 5,478,179 | D. Kress, et al. | Dec. 26, 1995 |

Of these, the patents issued to Friedline ('264), Keller ('707) and Rödel, et al. ('407) each disclose devices having a single cutting tool. Specifically, the '264 patent discloses a drill having an indexable carbide insert carried on the inboard flute thereof. Because the insert is offset from center, and because there is no insert carried on the outboard flute, the '264 device will tend to drift off-center while boring. The '707 and '407 patents disclose drilling tools having a holder for securement thereto of a cutting blade having a "V"-shaped cutting edge. The two sides of the cutting blade are symmetrical, with the apex of the "V" disposed coincidently with the axis of rotation. The inherent problem with such an arrangement is that at the center of rotation, there is no cutting forces applied. The only force applied to the workpiece at the center of rotation of the drill is a punching, or compressive, force.

Thus, the cutting blade is utilized at a reduced efficiency.

Kress, et al. ('179), disclose a reamer tip used as the cutting tool of a reamer. The '179 device is provided for compensation of initial wear subjected on the reamer tip when the reamer is first inserted into a machine bore.

Fabiano ('059) discloses an insert drill having three flutes, with each being provided with a cutting insert. The inserts of the '059 device appear to be disposed at the same angle with respect to the axis of the drill. However, the inboard cutting insert defines a cutting edge which is angled toward the drill axis as opposed to the remaining two cutting inserts which define cutting edges angled away from the drill axis.

Kubota ('272) discloses a drill having two cutting inserts, with one being disposed on the inboard flute and one on the outboard flute. The two cutting inserts define different sizes, with one spanning between the center axis of the drill and the perimeter of the drill, and with the other define a cutting edge approximately one-half that of the first. Various alternate embodiments are described. However, in each alternate embodiment, the cutting edge defined on the inboard flute is twice that of the outboard flute.

Similarly, Tukala ('246) teaches an indexable insert drill having cutting edges of different lengths. As in the Friedline ('264) device described above, when the cutting edges on the individual flutes are different (Friedline having a cutting edge of zero on the outboard flute), the drill will tend to drift off-center when boring a hole.

Hamilton ('943) discloses a drill with balanced inserts. However, neither of the inserts is positioned to remove material from the bore proximate the central axis thereof Specifically, as illustrated at 31 in FIG. 6 of the '943 patent, an area is defined wherein no material will be removed. Such a result is obviously not desirable in that the depth of the bore is limited and damage to the drill itself is imminent.

Bohnet, et al. ('011) teach a rotary boring tool with indexable cutter chips disposed on the inboard and outboard flutes of a drill body. The cutter chips are disposed in similar fashion to those of Fabiano ('059) as described above, with the inboard cutter chip having a cutting edge angled toward the axis of rotation. Converse to this embodiment, Koesashi, et al. ('123), disclose an embodiment wherein the outboard cutting insert defines a cutting edge angled toward the axis of rotation, and the inboard cutting insert defines a cutting edge angled away from the axis of rotation.

Karlsson, et al. ('455), teach a drill having two cutting inserts, each defining a different configuration. The outboard insert is triangular with chamfered corners. Although similar to the outboard insert, the cutting edge of the inboard insert defines two cutting edges disposed at an angle of preferably 15 to 25 degrees with respect to each other. The innermost cutting edge is disposed at an angle equal to that of the cutting edge of the outboard insert, with the outermost cutting edge of the inboard insert being at an angle of 15 to 25 degrees steeper.

Hopkins ('328), Ebenhoch ('113), and Meyer ('618) each disclose indexable insert drills having at least one insert carried by each of the inboard and outboard flutes of the drill body. Each insert is disposed at an angle independent of every other insert. For example, in the '618 patent, each successive insert away from the axis of rotation is disposed at a graduated angle with respect to the normal of the axis of rotation. However, neither of these patents disclose a device wherein the innermost inboard insert is at a first angle with respect to the normal of the axis of rotation while every remaining insert is disposed at a greater angle with respect to the first, but at the same angle with respect to each other.

The prior art disclosed above is also lacking of such a teaching. Further, the prior art disclosed above does not disclose a drill with indexable inserts whereby the inserts are disposed at various angles and whereby the cutting area of each insert is substantially equal to that of each other individual insert, such that the forces exerted upon each insert is equal, thereby reducing the tendency of the drill to drift off-center.

Therefore, it is an object of this invention to provide a drill having a drill body and a plurality of indexable inserts, the drill body defining an inboard flute and an outboard flute, and the indexable inserts being disposed such that the innermost inboard insert is at a first angle with respect to the normal of the axis of rotation while every remaining insert is disposed at a greater angle with respect to the first, but at the same angle with respect to each other.

It is also an object of the present invention to provide such a drill wherein the indexable inserts are disposed at various angles and wherein the cutting area of each insert is substantially equal to that of each other individual insert, such that the forces exerted upon each insert is equal, thereby reducing the tendency of the drill to drift off-center.

DISCLOSURE OF THE INVENTION

Other objects and advantages will be accomplished by the present invention which is a drill having cutting inserts disposed such that cutting forces on the inboard and outboard flutes of the drill body are substantially equal while boring a hole, thereby keeping the drill body substantially centered. Moreover, in the preferred embodiment the drill includes a guide on the inboard flute to maintain the alignment of the drill when exiting a workpiece.

The drill of the present invention includes a drill body and a plurality of cutting inserts. The drill body includes a shank portion configured to be received by the spindle of a machine using the drill. A collar is defined between the shank and a fluted portion. The fluted portion of the drill body defines two flutes, an inboard flute and an outboard flute. The inboard flute cuts to the center of the bore and the outboard flute cuts to the outside diameter of the bore. At least one cutting insert is releasably secured to each of the inboard and outboard flutes, with an equal number of cutting inserts carried by each. An insert pocket is defined by the drill for closely receiving each cutting insert such that the leading face of the cutting insert is substantially flush with the face of the flute. The cutting inserts are releasably secured to the respective inboard and outboard flutes using conventional securement devices such as, but not limited to, screws. Preferably, the cutting inserts are fabricated from carbide or cermet.

The cutting inserts are spaced on the inboard and outboard flutes such that as the drill bores a workpiece, the material removed by the cutting inserts on the inboard flute is equal to that removed by the cutting inserts on the outboard flute. On the inboard flute, the innermost cutting insert is positioned to extend slightly beyond the axis of rotation such that as the drill is rotated, material coincident with the axis of rotation is removed by cutting. On the outboard flute, the outermost cutting insert extends slightly beyond the perimeter of the drill body such that the bore diameter is larger than the drill body diameter in order to prevent binding. The exposed cutting edge of the innermost inboard cutting insert is disposed at a first angle with respect to a line normal to the axis of rotation. Each remaining cutting insert carried by the inboard flute, and each cutting insert carried by the outboard flute is disposed at a second angle with respect to a line normal to the axis of rotation.

The drill uses the geometry of each cutting insert, the geometry of the insert pocket, the width of cut on each insert and the resultant forces on each insert to equalize the radial forces being exerted on both sides of the drill as it cuts. The equalization of forces causes the drill to remain directly on center producing a high quality hole finish. Also, vibration and drill chatter are reduced significantly, thereby increasing tool life.

The drill may further be provided with a drill guide to assist in preventing the drill from drifting off-center. This is especially helpful in situations wherein the exit surface of the workpiece is not parallel to the entrance surface of the workpiece. The drill guide is disposed on the perimeter of the drill body on the inboard flange. The drill guide defines a curved leading edge disposed to contact the bore such that as the drill begins exiting the workpiece as illustrated, the drill guide serves to stabilize the same.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A self-centering indexable drill incorporating various features of the present invention is illustrated generally at 10 in the figures. The self-centering indexable drill, or drill 10, includes a drill body 12 having cutting inserts 26 disposed such that cutting forces on the inboard and outboard flutes 20,22 of the drill body 12 are substantially equal while boring a hole, thereby keeping the drill body 12 substantially centered. Moreover, in the preferred embodiment the drill 10 includes a guide 36 on the inboard flute 20 to maintain the alignment of the drill 10 when exiting a workpiece 50.

Figure 1:
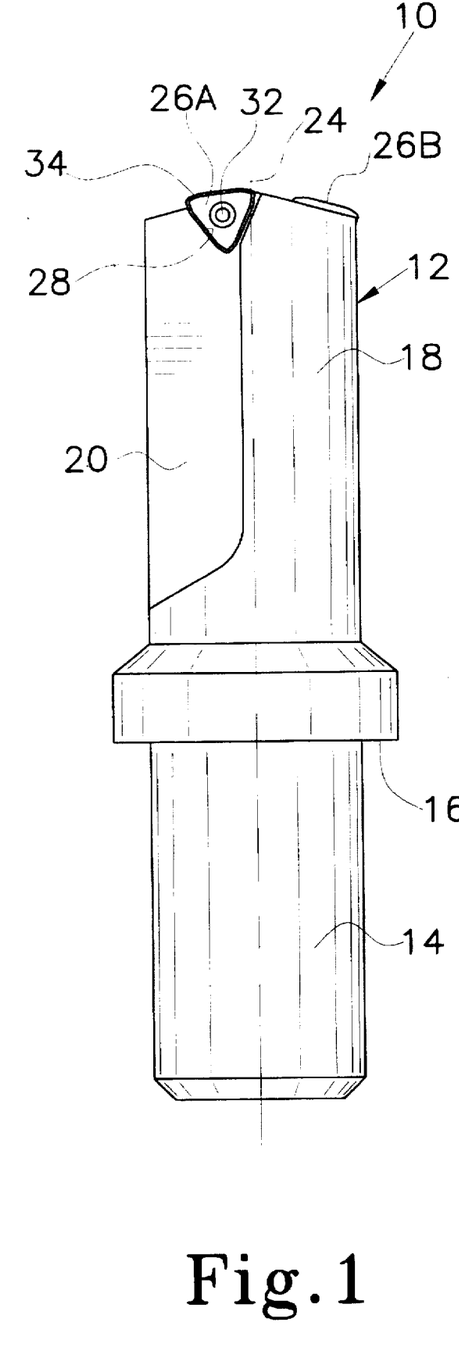
FIG. 1 is an elevation view of the self-centering indexable drill constructed in accordance with several features of the present invention showing one cutting insert carried by the inboard flute.
Figure 2:
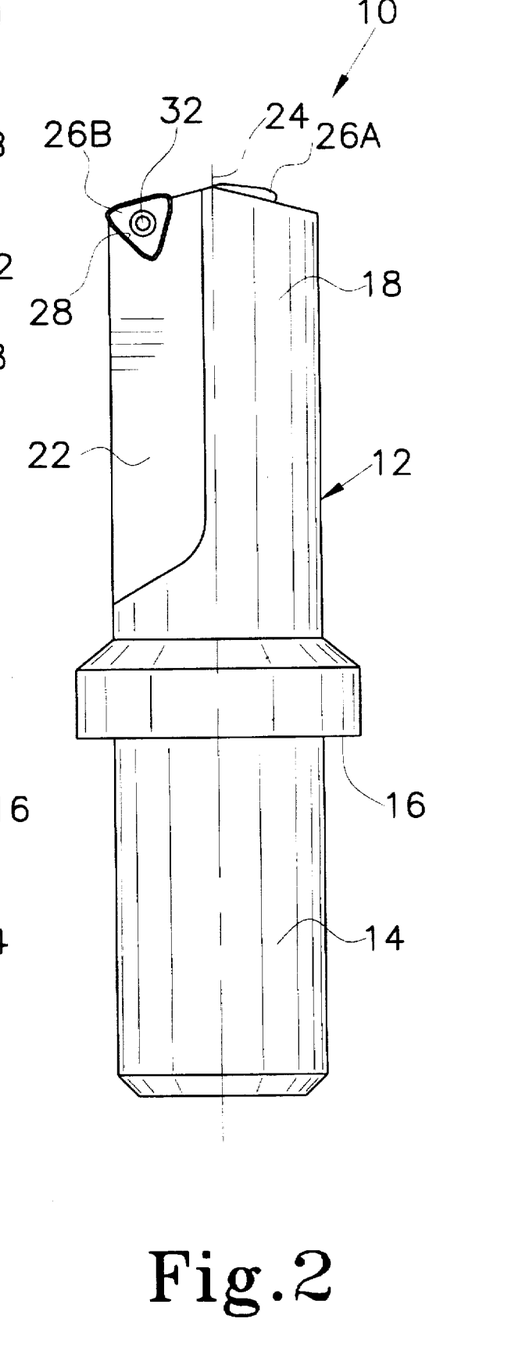
FIG. 2 is an elevation view of the self-centering indexable drill constructed in accordance with several features of the present invention showing one cutting insert carried by the outboard flute.
Figures 3, 4:
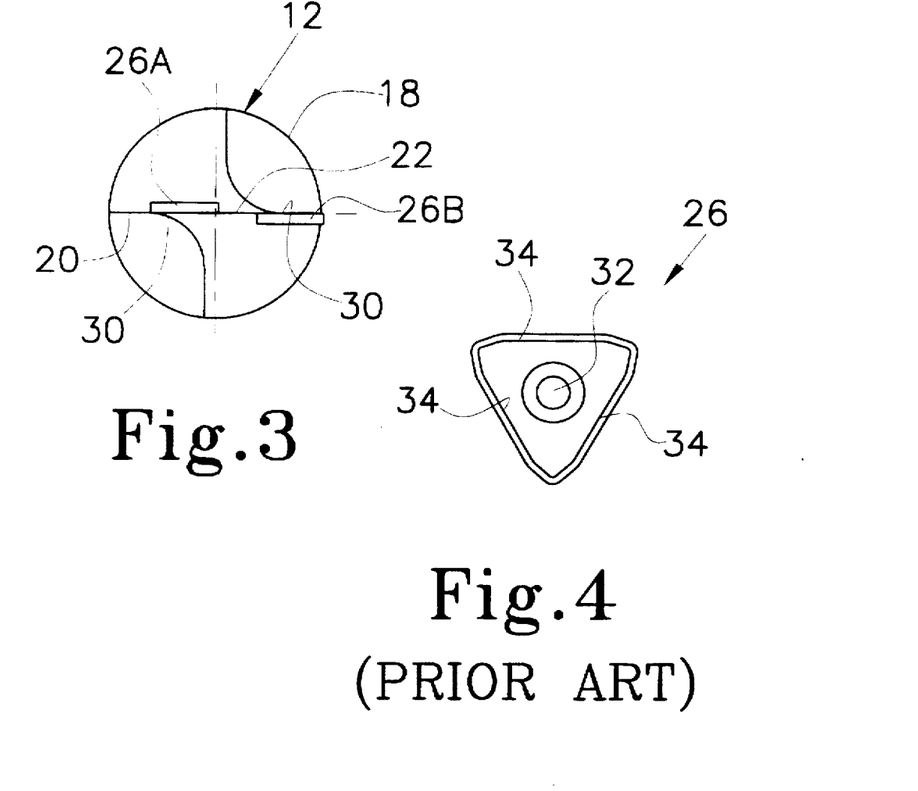
FIG. 3 illustrates an end view of the self-centering indexable drill of FIGS. 1 and 2.
FIG. 4 is an elevation view of a prior art cutting insert used in the present invention.

As best illustrated in FIGS. 1–3, the drill 10 of the present invention includes a drill body 12 and a plurality of cutting inserts 26. The drill body 12 includes a shank portion 14 configured to be received by the spindle of a machine (not shown) using the drill 10. A collar 16 is defined between the shank 14 and a fluted portion 18. The fluted portion 18 of the drill body 12 defines two flutes, an inboard flute 20 and an outboard flute 22. In the illustrated embodiment, the drill body 12 defines straight flutes 20,22. However, it will be understood that helical flutes may also be defined. In the illustrated embodiments, the inboard flute 20 cuts to center and the outboard flute 22 cuts to the outside diameter.

At least one cutting insert 26 is releasably secured to each of the inboard and outboard flutes 20,22, with an equal number of cutting inserts 26 carried by each. An insert pocket 28 is defined by the drill body 12 for closely receiving each cutting insert 26 such that the leading face 30 of the cutting insert 26 is substantially flush with the face of the flute 20,22. The preferred cutting insert 26 is that described by Koesashi, et al., U.S. Pat. No. 4,859,123, and currently manufactured by Mitsubishi Kinzoku Kabushiki Kaisha, Tokyo, Japan, and illustrated in FIG. 4 of the present disclosure. The cutting inserts 26 are releasably secured to the respective inboard and outboard flutes 20,22 using convention securement devices 32 such as, but not limited to, screws. Preferably, the cutting inserts 26 are fabricated from carbide or cermet. However, other conventional materials of fabrication may be used as well as the use of the cutting inserts 26 permits.

The cutting inserts 26 are spaced on the inboard and outboard flutes 20,22 such that as the drill 10 bores a workpiece 50, the material removed by the cutting inserts 26 on the inboard flute 20 is equal to that removed by the cutting inserts 26 on the outboard flute 22. On the inboard flute 20, the innermost cutting insert 26A is positioned to extend slightly beyond the axis of rotation 24 such that as the drill 10 is rotated, material coincident with the axis of rotation 24 is removed by cutting. On the outboard flute 22, the outermost cutting insert 24B extends slightly beyond the perimeter of the drill body 12 such that the bore diameter is larger than the drill body diameter in order to prevent binding. The exposed cutting edge 34B (see FIG. 9) of the innermost inboard cutting insert 26A is disposed at a first angle $\phi_B$ with respect to a line normal to the axis of rotation 24. Preferably, the angle $\phi_B$ is within the range of four to seven degrees (4°–7°). Each remaining cutting insert 26C carried by the inboard flute 20, and each cutting insert 26B,C carried by the outboard flute 22 is disposed at a second angle $\phi_E$ with respect to a line normal to the axis of rotation 24. Preferably, the angle $\phi_E$ is within the range of fourteen to nineteen degrees (14°–19°). The inserts 26C are illustrated in FIGS. 6–8 and 11.

Figure 5:
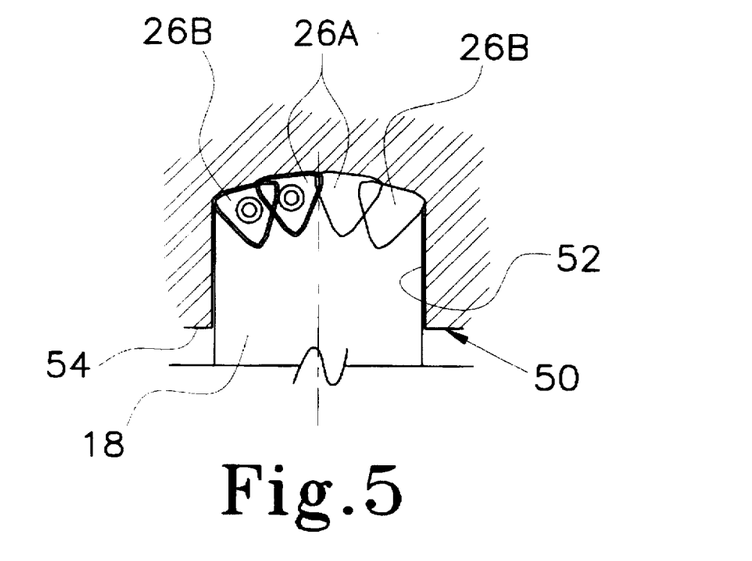
FIG. 5 is a cross-sectional view of a workpiece illustrating the boring profile of the self-centering indexable drill of FIGS. 1 and 2.

FIG. 5 illustrates a workpiece 50, in cross-section, as the drill 10 illustrated in FIGS. 1 and 2 is being used to bore a hole 52 therein. As illustrated, the paths of the two illustrated cutting inserts 26A,B overlap to insure that a clean bore 52 is manufactured.

Figure 6:
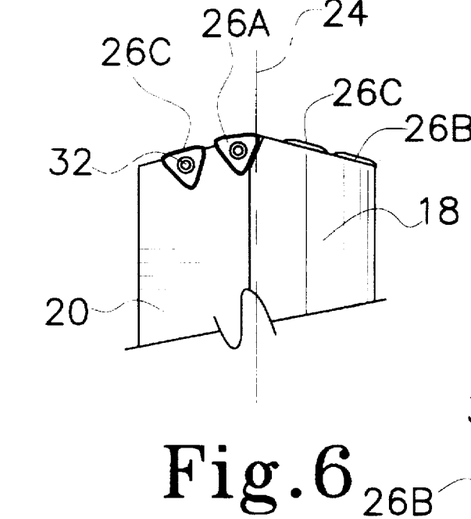
FIG. 6 is a partial elevation view of the self-centering indexable drill constructed in accordance with several features of the present invention showing two cutting inserts carried by the inboard flute.
Figure 7:
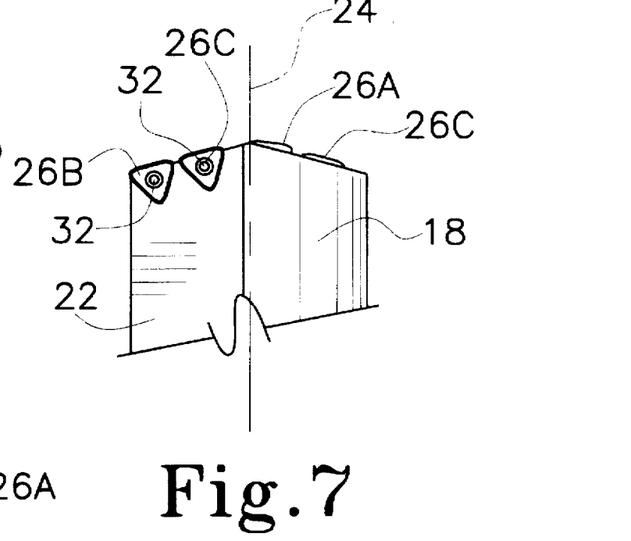
FIG. 7 is a partial elevation view of the self-centering indexable drill constructed in accordance with several features of the present invention showing two cutting inserts carried by the outboard flute.
Figure 8:
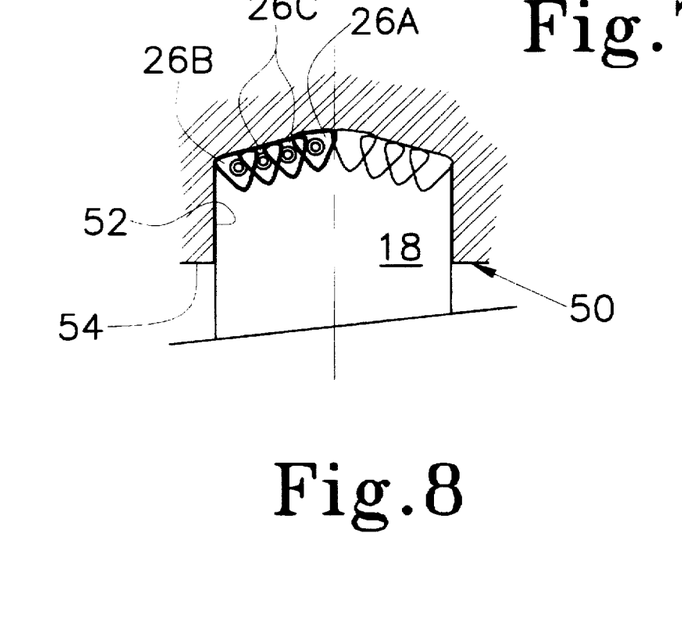
FIG. 8 is a cross-sectional view of a workpiece illustrating the boring profile of the self-centering indexable drill of FIGS. 6 and 7.
Figure 9:
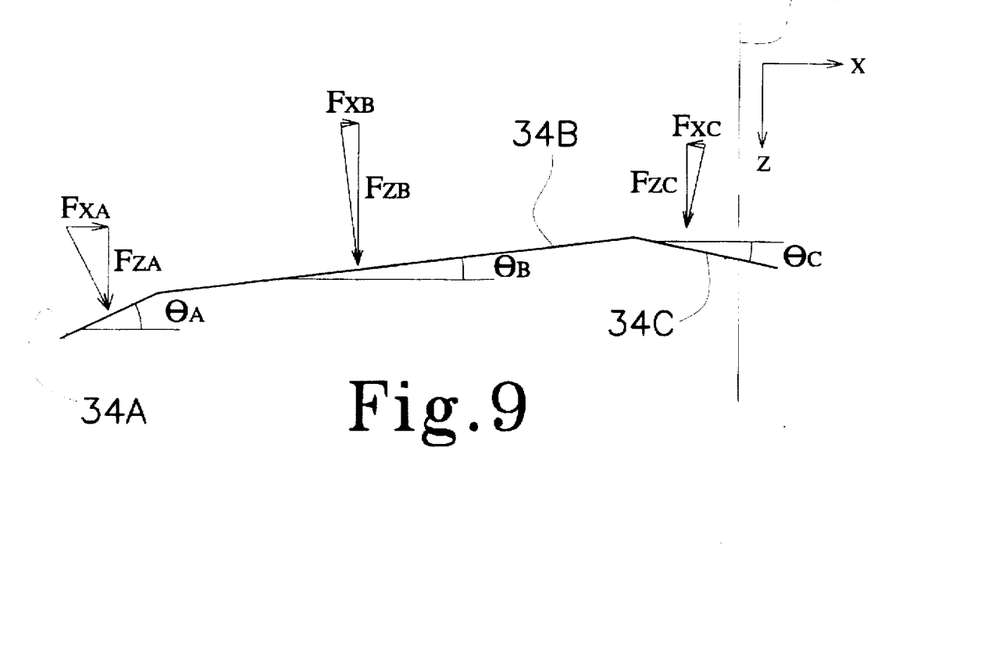
FIG. 9 is a profile of the innermost cutting insert carried by the inboard flute illustrating the vector components of forces applied to each leg of the cutting edge of the cutting insert.
Figure 10:
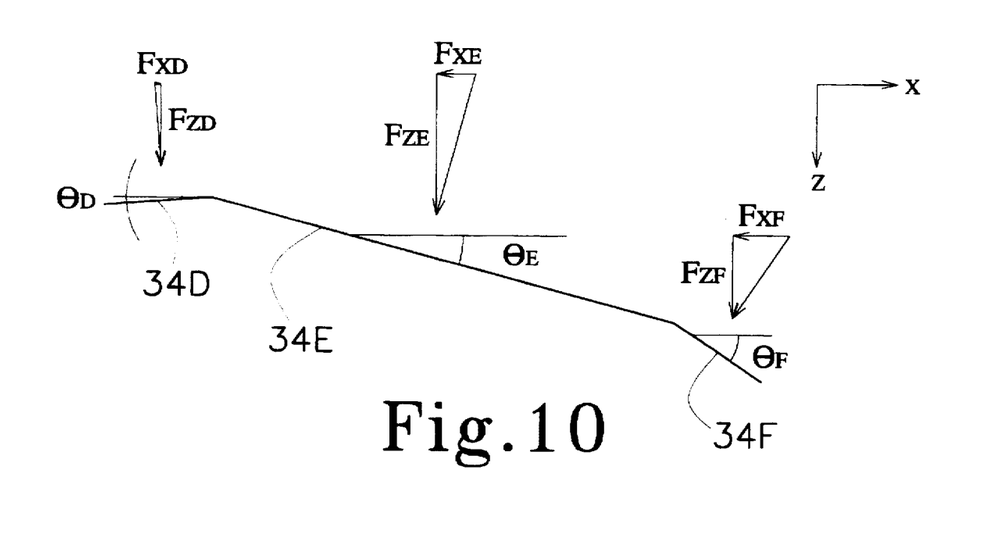
FIG. 10 is a profile of each cutting insert except the innermost inboard cutting insert illustrating the vector components of forces applied to each leg of the cutting edge of the cutting insert.

FIGS. 6–8 are correlative of FIGS. 1, 2 and 5 as described above. However, in each of FIGS. 6–8, two cutting inserts 26 are illustrated as being carried by each of the inboard and outboard flutes 20,22. As above, the innermost inboard cutting insert 26A is disposed at a first angle with respect to the normal of the axis of rotation 24, while each remaining cutting insert 26B,C is disposed at a second angle. The sum of the material cut by the inboard flute cutting inserts 26A,C is equal to the sum of the material cut by the outboard flute cutting inserts 26B,C, thereby balancing the forces exerting on each flute 20,22 and preventing the drill 10 from drifting off-center The drill 10 uses the geometry of each cutting insert 26, the geometry of the insert pocket 28, the width of cut on each cutting insert 26 and the resultant forces on each insert to equalize the radial forces being exerted on both the inboard and outboard flutes 20,22 of the drill 10 as it cuts. The equalization of forces causes the drill 10 to remain directly on center producing a high quality hole finish. Also, vibration and drill chatter are reduced significantly, thereby increasing tool life. FIG. 9 illustrates the geometry of the innermost inboard cutting insert 26A. Similarly, FIG. 10 illustrates the geometry of each remaining cutting insert 26B,C. In each of these figures, illustrated are the vector components of the forces applied to the inner leg, the central leg, and the outer leg of the cutting edge 34 of the cutting insert 26, with the "X" component being normal to the axis of rotation and the "Z" component being parallel to the axis of rotation 24. As discussed, the cutting inserts 26 are disposed such that the sum total force on either flute 20,22 is equal to that of the other flute 20,22. Assuming only one insert 26 on either flute 20,22, the independent angle at which each cutting insert 26 is disposed is determined as follows:

For the inboard cutting insert 26A, $F_{XA}(lb) = F_{ZA} A \tan\phi_A;$ $F_{XB}(lb) = F_{ZB} B \tan\phi_B;$ $F_{XC}(lb) = F_{ZC} C \tan\phi_C;$ and $\vec{F}_{xi}(lb) = \Sigma F_X = F_{XA} + F_{XB} + F_{XC}$ For the outboard cutting insert 26B, $F_{XD}(lb) = F_{ZD} D \tan\phi_D;$ $F_{XE}(lb) = F_{ZE} E \tan\phi_E;$ $F_{XF}(lb) = F_{ZF} F \tan\phi_F;$ and $\vec{F}_{xo}(lb) = \Sigma F_X = F_{XD} + F_{XE} + F_{XF}$ Comparing the two cutting inserts 26A,B, $F_{xi} = F_{xo}$ Therefore, substituting the values above:

$F_{ZA} A \tan\phi_A + F_{ZB} B \tan\phi_B + F_{ZC} C \tan\phi_C = F_{ZD} D \tan\phi_D + F_{ZE} E \tan\phi_E + F_{ZF} F \tan\phi_F$ and:

$A \tan\phi_A + A \tan\phi_B + C \tan\phi_C = D \tan\phi_D + E \tan\phi_E + F \tan\phi_F$ This analysis is made with several assumptions. First, it is assumed that the area of each cutting edge 34 is infinitely small such that the cutting edge 34 is considered a straight line with no depth. Further, it is assumed that $F_Z$ is an evenly distributed load per unit length (lb/length), and is therefore a function of the length of the engaged cutting edge 34. Finally, it is assumed that the force exerted on each cutting edge 34 is equal, or:

$F_{ZA} = F_{ZB} = F_{ZC} = F_{ZD} = F_{ZE} = F_{ZF}$

Where more than one cutting insert 26 is carried by each of the inboard and outboard flutes 20,22, such as illustrated in FIGS. 6–8, the additional inserts 26C are disposed at the same angle as the cutting insert 26B. In view of this, and further in view of the fact that an equal number of additional cutting inserts 26C is placed on each flute 20,22, it is readily seen that the forces exerted on the additional cutting inserts 26C are equal.

Figure 11:
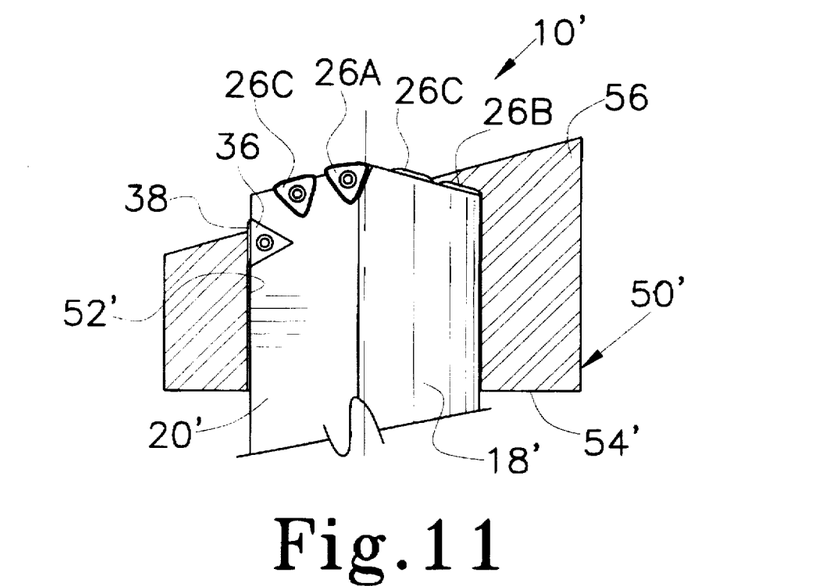
FIG. 11 is a cross-sectional view of a workpiece illustrating the boring profile of an alternate embodiment of the self-centering indexable drill showing a guide insert carried by the inboard flute.
Figure 12:
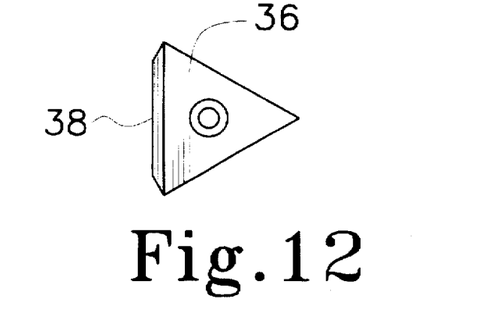
FIG. 12 is an elevation view of the guide insert illustrated in FIG. 11.
Figure 13:
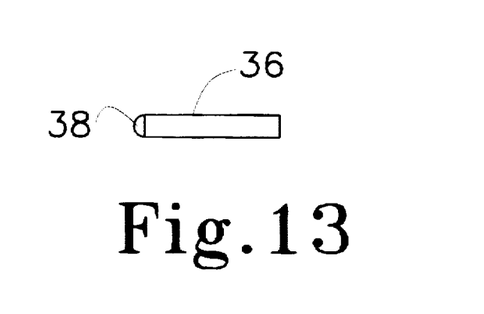
FIG. 13 is a side view of the guide insert illustrated in FIG. 11.
Figure 14:
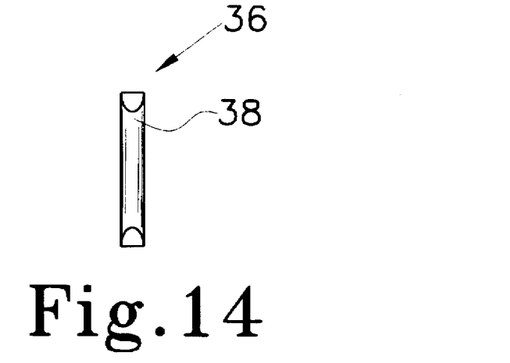
FIG. 14 is an end view of the guide insert illustrated in FIG. 11.

As illustrated in FIG. 11, the drill 10' may further be provided with a drill guide 36 to assist in preventing the drill 10 from drifting off-center. This is especially helpful in situations wherein the exit surface 56 of the workpiece 50' is not parallel to the entrance surface 54 of the workpiece 50'. The drill guide 36 is disposed on the perimeter of the drill body 12' on the inboard flange 20. The drill guide 36 defines a radiused leading edge 38 disposed to contact the bore 52' such that as the drill 10' begins exiting the workpiece 50' as illustrated, the drill guide 36 serves to stabilize the same. Based upon the above geometrical analysis, when the drill 10' is exiting the illustrated workpiece, there is reduced or no force exerted on a portion of the cutting edges 34. In the illustration, when the drill 10' is in the shown orientation with respect to the workpiece 50', there is no force on the inboard flute 20' and reduced force on the outboard flute 22'. Therefore, with the drill guide 36 in place, the drill guide 36 provides a balancing effect within the bore 52. In the preferred embodiment, the radiused leading edge 38 is polished to reduce resistance between the drill guide 36 and the bore 52.

From the foregoing description, it will be recognized by those skilled in the art that a Self-centering indexable drill offering advantages over the prior art has been provided. Specifically, the Self-centering indexable drill provides a drill body having removable cutting inserts carried by each of the inboard and outboard flutes. The cutting inserts are configured and disposed such that the cutting forces on each side the inboard and outboard flutes is equal, therefore reducing the tendency of the drill to drift off-center. In so doing, the drill operates at increased efficiency, thereby reducing the required power. The innermost inboard cutting insert is disposed at a first angle with respect to a line normal to the axis of rotation of the drill, while each remaining cutting insert is disposed at a second angle.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

We claim:

1. A self-centering indexable drill for drilling a hole in a workpiece, said self-centering indexable drill comprising:

a drill body having a cylindrical configuration defining an axis of rotation and further defining at least a shank portion and a fluted portion, said fluted portion including an inboard flute and an outboard flute;

a first cutting insert carried by said drill body on said inboard flute, said first cutting insert defining a cutting edge having a first end and a second end, said first cutting insert being disposed on said inboard flute such that said cutting edge intersects said axis of rotation between said first and second ends of said cutting edge proximate said first end thereof, said first cutting insert being disposed at a first angle with respect to said axis of rotation and defining a first cutting area for removal of material from the workpiece, said first angle being within the range of four to seven degrees; and a second cutting insert carried by said drill body on said outboard flute, said second cutting insert defining a cutting edge having a first end and a second end, said second cutting insert being disposed on said outboard flute such that said cutting edge second end extends beyond an outside diameter of said drill body, said second cutting insert being disposed at a second angle with respect to said axis of rotation, said second cutting insert defining a second cutting area substantially equal to said first cutting area of said first cutting insert, said second angle being within the range of fourteen to nineteen degrees.

2. The self-centering indexable drill of claim 1 wherein said inboard flute defines a first insert pocket for closely receiving said first cutting insert such that a leading face of said first cutting insert is disposed substantially flush with said inboard flute, and wherein said outboard flute defines a second insert pocket for closely receiving said second cutting insert such that a leading face of said second cutting insert is disposed substantially flush with said outboard flute.

3. The self-centering indexable drill of claim 1 wherein said inboard flute defines a first insert pocket for closely receiving said first cutting insert such that a leading face of said first cutting insert is disposed substantially flush with said inboard flute, wherein said outboard flute defines a second insert pocket for closely receiving said second cutting insert such that a leading face of said second cutting insert is disposed substantially flush with said outboard flute, and wherein each of said inboard and out board flutes defines at least one third insert pocket for closely receiving said plurality of third cutting inserts such that a leading face of each of said plurality of third cutting inserts is disposed substantially flush with a respective of said inboard and outboard flutes.

4. A self-centering indexable drill for drilling a hole in a workpiece, said self-centering indexable drill comprising:

a drill body having a cylindrical configuration defining an axis of rotation and further defining at least a shank portion and a fluted portion, said fluted portion including an inboard flute and an outboard flute, a first cutting insert carried by said drill body on said inboard flute, said first cutting insert defining a cutting edge having a first end and a second end, said first cutting insert being disposed on said inboard flute such that said cutting edge intersects said axis of rotation between said first and second ends of said cutting edge proximate said first end thereof, said first cutting insert being disposed at a first angle with respect to said axis of rotation and defining a first cutting area for removal of material from the workpiece, said first angle being within the range of four to seven degrees;

a second cutting insert carried by said drill body on said outboard flute, said second cutting insert defining a cutting edge having a first end and a second end, said second cutting insert being disposed on said outboard flute such that said cutting edge second end extends beyond an outside diameter of said drill body, said second cutting insert being disposed at a second angle with respect to said axis of rotation, said second cutting insert defining a second cutting area substantially equal to said first cutting area of said first cutting insert, said second angle being within the range of fourteen to nineteen degrees; and a plurality of third cutting inserts, an equal number of said third cutting inserts being carried by each of said inboard flute and said outboard flute, said third cutting inserts carried by said inboard flute being disposed between said first cutting insert and said outside diameter of said drill body, and said third cutting inserts carried by said outboard flute being disposed between said second cutting insert and said axis of rotation, each of said plurality of third cutting inserts being disposed at said second angle with respect to said axis of rotation and defining a third cutting area such that a total cutting area of said inboard flute is substantially equal to a total cutting area of said outboard flute.

5. The self-centering indexable drill of claim 4 wherein said inboard flute defines a first insert pocket for closely receiving said first cutting insert such that a leading face of said first cutting insert is disposed substantially flush with said inboard flute, wherein said outboard flute defines a second insert pocket for closely receiving said second cutting insert such that a leading face of said second cutting insert is disposed substantially flush with said outboard flute, and wherein each of said inboard and out board flutes defines at least one third insert pocket for closely receiving said plurality of third cutting inserts such that a leading face of each of said plurality of third cutting inserts is disposed substantially flush with a respective of said inboard and outboard flutes.

6. The self-centering indexable drill of claim 4 further comprising a drill guide disposed on said inboard flute and defining a radiused leading edge, said radiused leading edge being disposed substantially parallel with said axis of rotation and extending beyond said outside diameter of said drill body.

7. A self-centering indexable drill for drilling a hole in a workpiece, said self-centering indexable drill comprising:

a drill body having a cylindrical configuration defining an axis of rotation and further defining at least a shank portion and a fluted portion, said fluted portion including an inboard flute and an outboard flute, a first cutting insert carried by said drill body on said inboard flute, said first cutting insert defining a cutting edge having a first end and a second end, said first cutting insert being disposed on said inboard flute such that said cutting edge intersects said axis of rotation between said first and second ends of said cutting edge proximate said first end thereof, said first cutting insert being disposed at a first angle with respect to said axis of rotation and defining a first cutting area for removal of material from the workpiece;

a second cutting insert carried by said drill body on said outboard flute, said second cutting insert defining a cutting edge having a first end and a second end, said second cutting insert being disposed on said outboard flute such that said cutting edge second end extends beyond an outside diameter of said drill body, said second cutting insert being disposed at a second angle with respect to said axis of rotation, said second cutting insert defining a second cutting area substantially equal to said first cutting area of said first cutting insert; and a drill guide disposed on said inboard flute and defining a radiused leading edge, said radiused leading edge being disposed substantially parallel with said axis of rotation and extending beyond said outside diameter of said drill body.

8. The self-centering indexable drill of claim 7 wherein said first angle with respect to said axis of rotation is smaller than said second angle with respect to said axis of rotation.

9. The self-centering indexable drill of claim 8 wherein said first angle with respect to said axis of rotation is within the range of four to seven degrees and said second angle with respect to said axis of rotation is within the range of fourteen to nineteen degrees.

10. The self-centering indexable drill of claim 7 wherein said inboard flute defines a first insert pocket for closely receiving said first cutting insert such that a leading face of said first cutting insert is disposed substantially flush with said inboard flute, and wherein said outboard flute defines a second insert pocket for closely receiving said second cutting insert such that a leading face of said second cutting insert is disposed substantially flush with said outboard flute.

11. The self-centering indexable drill of claim 7 further comprising a plurality of third cutting inserts, with an equal number of said third cutting inserts being carried by each of said inboard flute and said outboard flute, said third cutting inserts carried by said inboard flute being disposed between said first cutting insert and said outside diameter of said drill body, and said third cutting inserts carried by said outboard flute being disposed between said second cutting insert and said axis of rotation, each of said plurality of third cutting inserts being disposed at said second angle with respect to said axis of rotation and defining a third cutting area such that a total cutting area of said inboard flute is substantially equal to a total cutting area of said outboard flute.

12. The self-centering indexable drill of claim 11 wherein said inboard flute defines a first insert pocket for closely receiving said first cutting insert such that a leading face of said first cutting insert is disposed substantially flush with said inboard flute, wherein said outboard flute defines a second insert pocket for closely receiving said second cutting insert such that a leading face of said second cutting insert is disposed substantially flush with said outboard flute, and wherein each of said inboard and out board flutes defines at least one third insert pocket for closely receiving said plurality of third cutting inserts such that a leading face of each of said plurality of third cutting inserts is disposed substantially flush with a respective of said inboard and outboard flutes.

* * * * *